United States Patent
Barker

[19]

[11] Patent Number: 5,823,022
[45] Date of Patent: Oct. 20, 1998

[54] TAILGATE LOCK

[76] Inventor: Bob Barker, 17890 Slater Rd., N. Ft. Myers, Fla. 33917

[21] Appl. No.: 954,189

[22] Filed: Oct. 20, 1997

[51] Int. Cl.[6] .......................... B62D 33/033; E05B 67/24
[52] U.S. Cl. ................................ 70/38 A; 49/394; 70/39; 70/53; 70/164; 70/258; 292/319; 292/323; 296/57.1
[58] Field of Search ................................... 70/14, 18, 26, 70/30, 38 A, 39, 49, 53, 58, 159, 164, 237, 258; 24/585, 625; 49/394, 399, 503; 292/318–320, 323, DIG. 17, DIG. 29, DIG. 43; 296/57.1

[56] References Cited

U.S. PATENT DOCUMENTS

| 345,764 | 7/1886 | Brooks | 292/320 |
|---|---|---|---|
| 1,239,966 | 9/1917 | Reynolds | 292/320 |
| 1,343,870 | 6/1920 | James | 70/18 |
| 1,545,902 | 7/1925 | Johnson | 70/53 |
| 1,690,938 | 11/1928 | Maxwell | 70/53 |
| 1,930,560 | 10/1933 | Keidel | 292/318 |
| 2,700,289 | 1/1955 | Morgan | 70/14 |
| 2,924,960 | 2/1960 | Palazzo | 70/53 |
| 3,146,012 | 8/1964 | King, Sr. | 292/320 |
| 5,365,757 | 11/1994 | Primeau | 70/14 |
| 5,415,058 | 5/1995 | Young et al. | 292/307 B X |
| 5,427,423 | 6/1995 | Georgopoulos | 292/320 |

FOREIGN PATENT DOCUMENTS

| 7648 | 10/1899 | Norway | 70/49 |
|---|---|---|---|

*Primary Examiner*—Lloyd A. Gall
*Attorney, Agent, or Firm*—Ronald E. Smith

[57] ABSTRACT

A lock and keeper assembly are employed to secure a pickup truck tailgate against theft. A conventional keeper is modified by flattening its bight region. The flattened bight is placed into capturing relation to a transversely disposed, inwardly extending protrusion formed in a side wall of the pickup truck adjacent the tailgate. A transversely disposed, outwardly extending hollow, "C"-shaped axle integral with the tailgate receives the protrusion, so the flattened bight and the lock body cooperate to trap the protrusion within the hollow axle. The hollow axle cannot be separated from the protrusion without first defeating the lock.

6 Claims, 4 Drawing Sheets

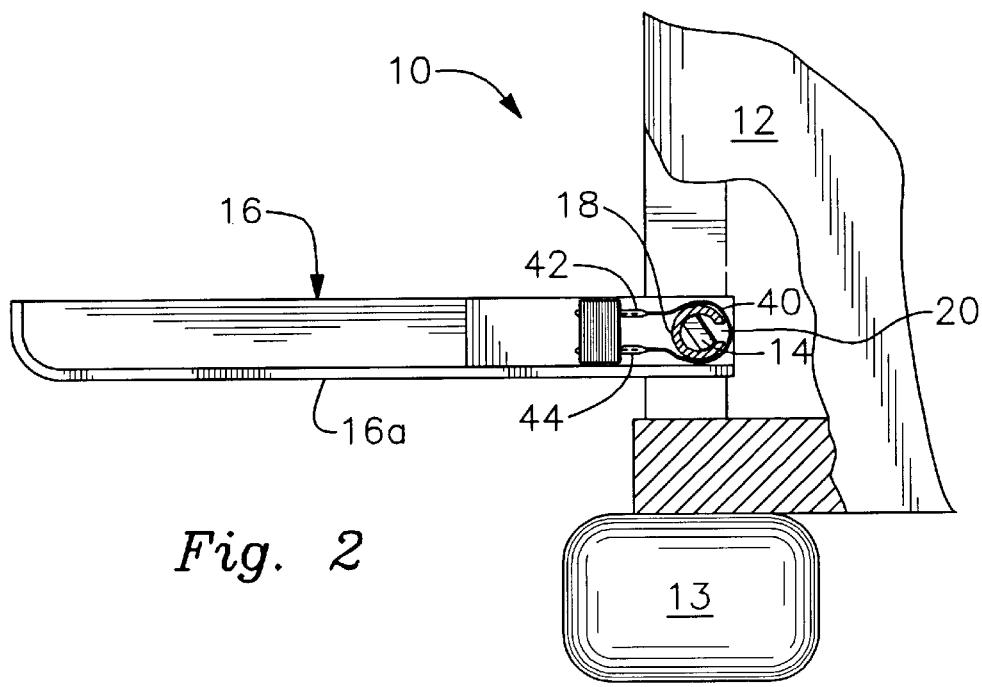
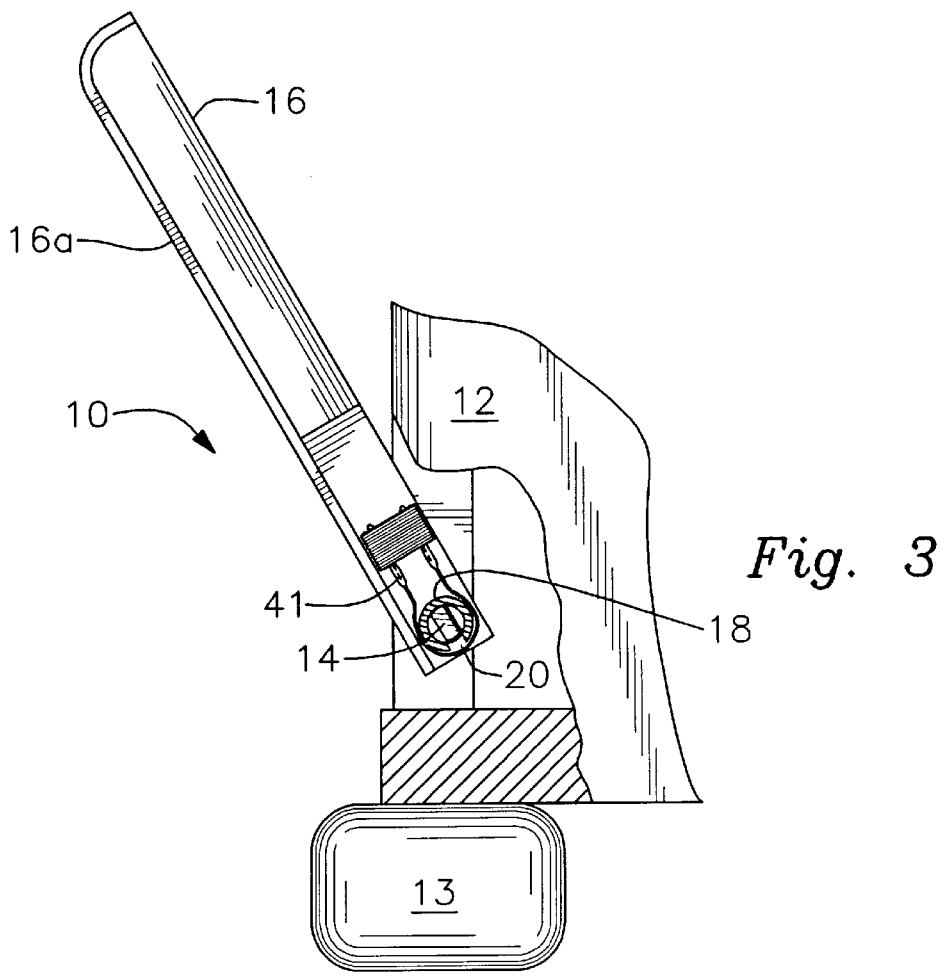

TAILGATE LOCK

BACKGROUND OF THE INVENTION

1. Field of the invention

This invention relates, generally, to anti-theft locking devices. More particularly, it relates to a locking device that prevents facile theft of a pickup truck tailgate.

2. Description of the Prior Art

The tailgate of a pickup truck can be stolen easily. The gate is simply swung open and an axle at the lower end thereof is lifted from a slotted protrusion that is connected to the truck body on the outboard side of the axle. An axle at the opposite end of the tailgate is then removed from a circular recess formed in the truck body and the tailgate is disconnected from the truck. Since neither end is secured to its slotted protrusion or recess, the act of removing a tailgate takes less time than it takes to describe the procedure.

Since tailgate theft can be accomplished quickly, silently, and easily without tools, such theft has become widespread. The thief sells the tailgate to a body shop, and the body shop refinishes it and resells it to a customer whose tailgate has been stolen. Thus, the theft is lucrative for both the thief and the body shop owner.

A victim repurchasing a tailgate that might be his or her own tailgate can spend hundreds of dollars, depending upon the make, model, and year of the truck from which the tailgate was lifted. Since the theft is covered by insurance, the claims cause premiums to be driven upwardly. It follows that a device is needed to inhibit tailgate theft.

U.S. Pat. No. 5,415,058 to Young discloses a device that has utility in reducing tailgate theft. It includes a special type of lock and a special type of keeper that captures an axle of a tailgate received within a slotted protrusion so that a thief cannot lift said axle from said slotted protrusion without first defeating the lock.

There are a few features of the Young device that somewhat inhibit its utility, however. First, the keeper that retains the tailgate axle in the slotted protrusion has a complex shape and is therefore expensive to fabricate. Furthermore, a special lock plunger that serves as a linear lock shackle is required to secure the keeper to the lock body. Moreover, the opposite ends of the keeper are positioned in abutting relation to one another when the keeper is in repose, so said opposite ends must be pulled apart from one another when positioning the keeper around the protrusion that receives the axle. Such pulling apart is not easy because the keeper is made of a spring steel and thus is strongly biased to remain in its repose configuration. Accordingly, the device can be difficult to install for someone who lacks muscular strength in the hands and fingers.

Ford Motor Company has recently introduced a locking mechanism that prevents facile tailgate theft, but the locking mechanism also locks the tailgate itself. Thus, the tailgate cannot be folded into its down position without first unlocking the lock. Many owners of such a truck will dutifully lock their tailgates every time the gate is folded into its upright position, especially when the truck is new. However, with the passage of time, the owners will tire of always needing to unlock the gate to lower it and to lock it back up after raising it; the tailgate will then remained unlocked at all times and the factory-provided lock will fall into disuse.

What is needed, then, is a device that accomplishes the same result as the Young device, but which does not require a special type of lock. Moreover, the device should be of simple construction and it should not be difficult to install.

A device is also needed that does not require locking or unlocking of the tailgate every time the tailgate is raised or lowered, respectively.

However, in view of the art considered as a whole at the time the present invention was made, it was not obvious to those of ordinary skill in the pertinent arts how the needed improvements could be provided.

SUMMARY OF THE INVENTION

The longstanding but heretofore unfulfilled need for an apparatus that overcomes the limitations of the prior art is now met by a new, useful, and nonobvious invention. The present invention is an anti-theft device for locking a tailgate onto a pickup truck of the type where the tailgate has a transversely disposed, outwardly protruding, "C"-shaped hollow axle at a lowermost corner thereof and where the pickup truck includes a transversely disposed, inwardly protruding protrusion that is received within the hollow axle through the opening defined by the opposite ends of the "C"-shaped hollow axle.

The novel locking device has a lock body, a keeper, and a locking means within the lock body; the locking means has a locked configuration and an unlocked configuration.

The keeper has cylindrical opposite ends, of solid construction, interconnected by a thin, flat bight member formed of a flexible, inherently resilient material. A plurality of longitudinally spaced notches are formed in each of the cylindrical opposite ends of the keeper. The lock body has a pair of spaced apart bores for releasably receiving the cylindrical opposite ends of the keeper; the locking means maintains the opposite ends of the keeper within the lock body by engaging preselected notches of the plurality of notches when the locking means is in its locked configuration. The locking means releases both ends of the keeper by releasing the preselected notches when the locking means is in its unlocked configuration.

The cylindrical opposite ends of the keeper are disposed in diverging relation to one another when in repose and in parallel relation to one another when the cylindrical opposite ends are received within the bores.

The lock body and the keeper are positioned in a space between the pickup truck body and the tailgate when the keeper and lock body are disposed in enclosing relation to the hollow axle and protrusion so that the lock body and the keeper do not interfere with opening and closing of the tailgate.

A space enclosed by the keeper and the lock body is made progressively smaller when the opposite ends of the keeper are inserted progressively further into the lock body so that the enclosed space may be sized to receive hollow axles of differing diameters.

The flat bight member has a bulbous configuration relative to the cylindrical opposite ends of the keeper so that said flat bight member may easily surround and accommodate the hollow axle.

It is a primary object of this invention to provide a tailgate lock that uses a conventional lock body.

Another object is to provide a tailgate lock having a keeper of simple construction that is easy to install.

Still another object is to provide a tailgate lock that remains locked at all times and which does not require unlocking whenever a tailgate is raised or lowered.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a side elevational view of the parts depicted in FIG. 1, depicting the novel lock assembly in its operable configuration and illustrating the tailgate in its fully open configuration;

FIG. 3 is a side elevational view of the parts depicted in FIG. 1, depicting the novel lock assembly in its operable configuration and illustrating how the novel lock assembly prevents removal of the tailgate.

DETAILED DESCRIPTION OF THE PREFERRED EMBODIMENT

Figure 1:
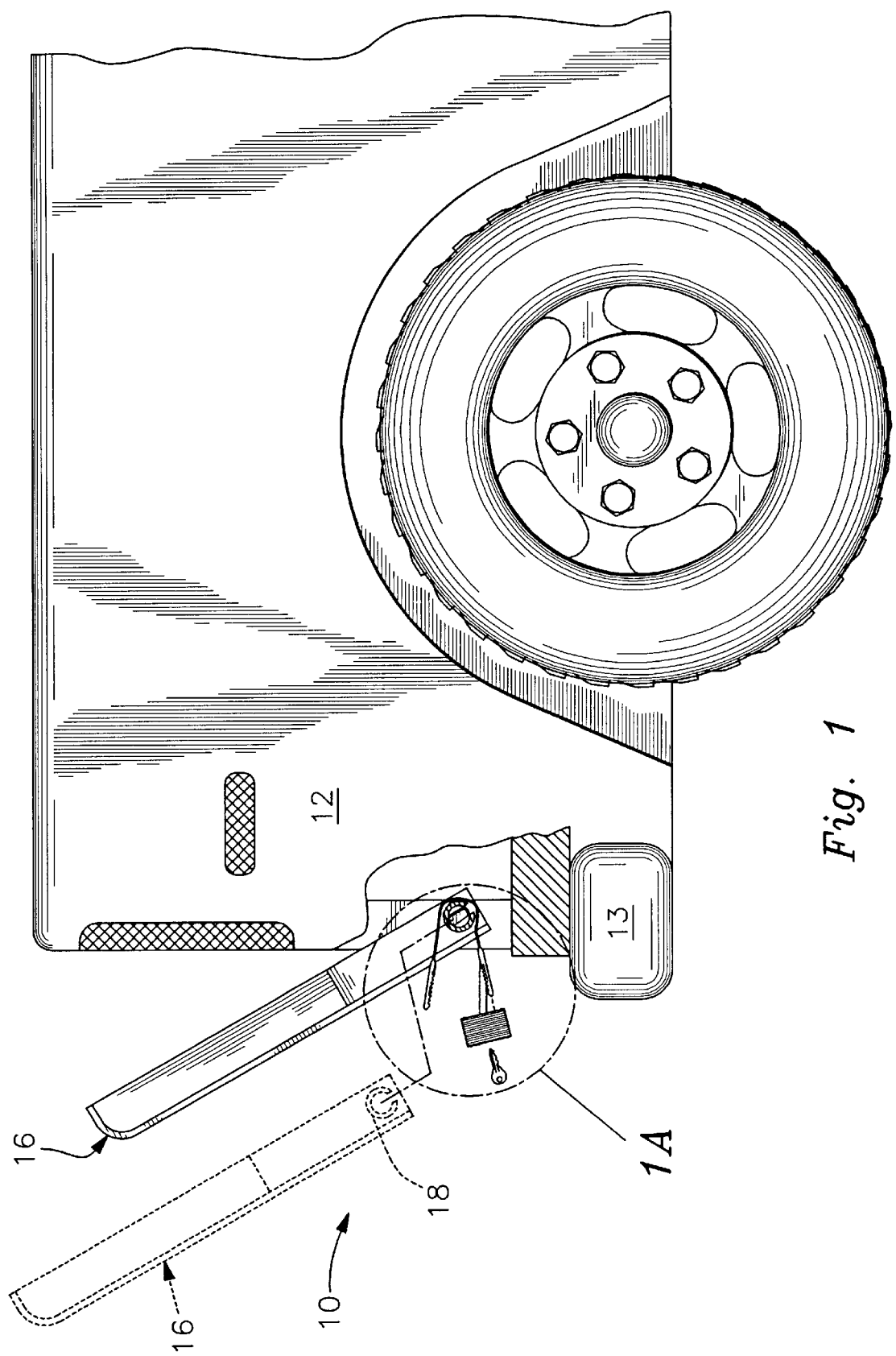
FIG. 1 is a side elevational, partially cut away view of the tailgate area of a pickup truck, including an exploded view of the novel locking means and indicating in dotted lines how the tailgate can be rotated to detach it from its mount in the absence of the novel locking device.
Figure 1A:
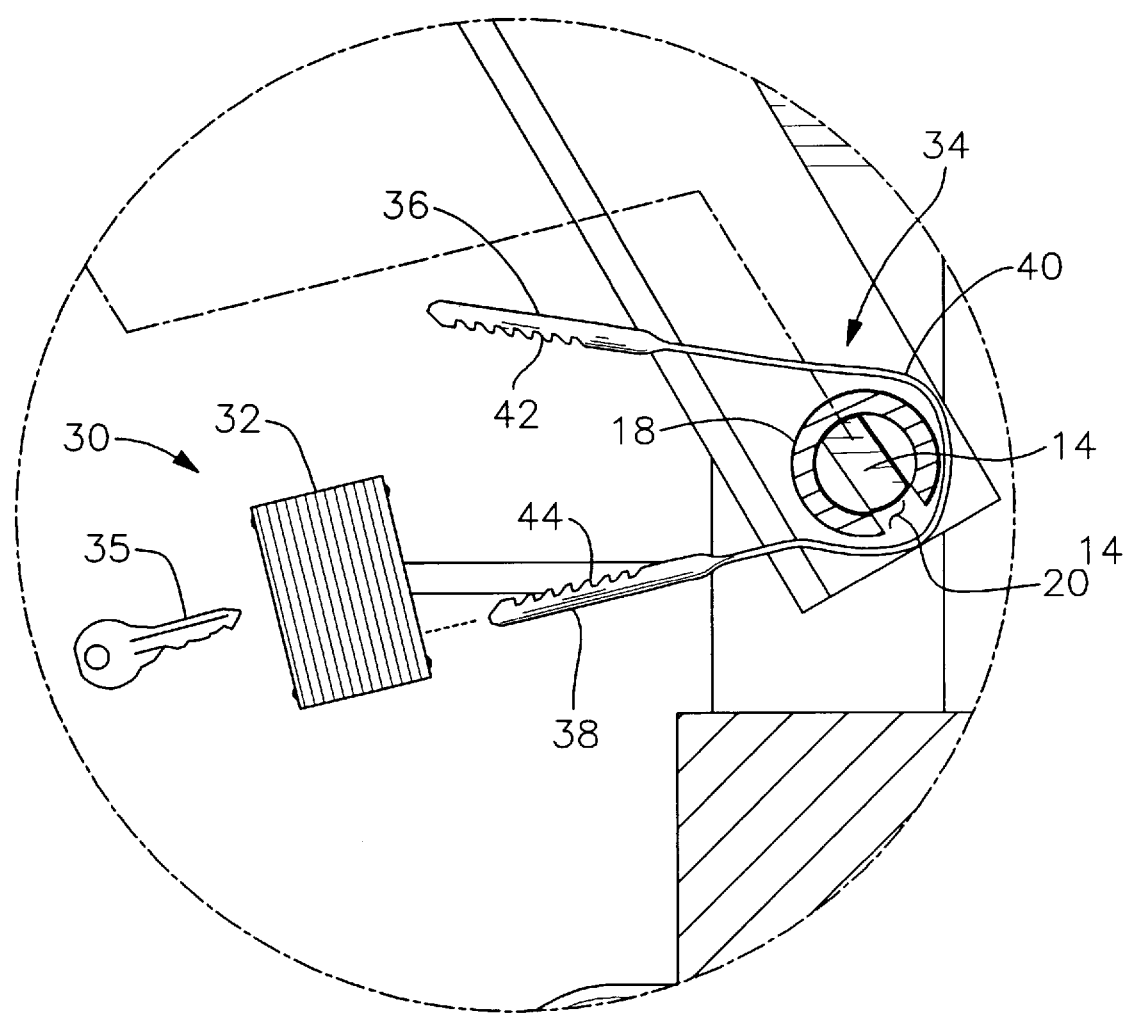
FIG. 1A is an enlarged view of the circled part of FIG. 1 that is denoted 1A.
Figure 4:
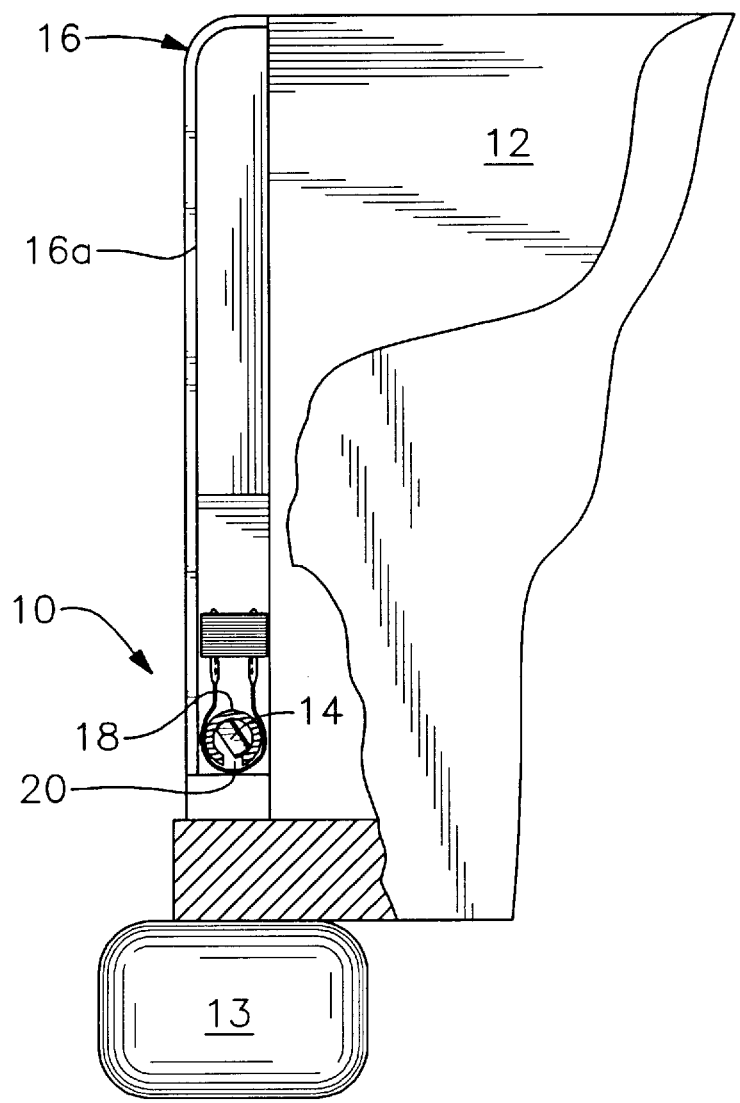
FIG. 4 is a side elevational view of the parts depicted in FIG. 1, depicting the novel lock assembly in its operable configuration and illustrating the tailgate in its fully closed configuration.

Referring now to FIGS. 1–4, including FIG. 1A, it will there be seen that an exemplary environment of the invention is denoted as a whole by the reference numeral 10.

In the description that follows, the terms "outwardly extending," "inwardly extending," and "transversely disposed" are with respect to a longitudinal axis of symmetry of a pickup truck.

The pickup truck body includes longitudinally disposed side wall 12 having a transversely disposed, inwardly extending protrusion 14, of solid construction, having an axis of symmetry that is tilted about thirty to forty five degrees from a vertical plane, in a rearwardly direction relative to the forward end of the pickup truck, as indicated in all four Figures. Said protrusion 14 is integrally formed with truck sidewall 12 and therefor does not move.

Member 13 is a bumper.

A tailgate 16 has a transversely disposed, outwardly extending, "C"-shaped hollow axle 18 formed in its lower end; said hollow axle 18 includes an opening 20 defined by opposite ends of said "C"-shaped hollow axle, and said hollow axle rotates conjointly with tailgate 16. The width or span of opening 20 is slightly greater than the width of protrusion 14. Accordingly, when the pickup truck tailgate is mounted to the truck in its operable configuration, protrusion 14 is housed within hollow axle 18 as indicated in all four Figures.

Removing tailgate 16 from the truck is accomplished simply by opening said tailgate to a point where opening 20 aligns with protrusion 14 and lifting hollow axle 18 from said protrusion 14, as indicated by the assembly line in FIG. 1. Note that the tailgate cannot be separated from its operable mount if said tailgate is rotated at any other angle of rotation. The angle of the tailgate, relative to a vertical plane, must be the same as the angle of protrusion 14 so that opening 20 of hollow axle 18 is aligned with said protrusion 14, if said tailgate is to be removed.

The unillustrated opposite end of the tailgate is secured to an opposite side wall of the truck body by a similar means that is defeated easily after hollow axle 18 has been lifted from protrusion 14. More particularly, the unillustrated opposite end includes an outwardly extending, transversely disposed, circular axle formed in the lower end of the tailgate. Said axle at said opposite end is slideably received within a circular recess, not shown, formed in said opposite side wall of the truck body. Thus, when axle 18 has been lifted from protrusion 14, it is a simple matter to extract the axle at said opposite end from its recess.

It should be understood that the axles at the opposite ends of a tailgate provide the pivot means about which the tailgate rotates when it is opened and closed.

As best seen in FIG. 1A, the novel device, denoted 30 as a whole, that defeats facile separation of tailgate 16 from side wall 12 includes a lock body 32 of conventional construction and a novel keeper 34. Lock body 32 may be of the type that releases keeper 34 when a key 35 is employed in the well-known way, or it may employ a combination or other type of locking means. The depicted lock body 32 includes both a keyed locking means and a combination locking means. It is of sturdy construction so that it can not be unlocked with a hammer blow, a crowbar, or the like.

Keeper 34 includes cylindrical opposite ends 36, 38 of solid construction and an elongate, thin, flat bight member 40 therebetween. Bight member 40 is flexible, preferably made of metal and inherently resilient. Note that it is bulbous and thus able to accommodate protrusion hollow axle 18.

There are two ways of making bight member 40. First, it may be integrally formed with said opposite ends 36, 38, by starting with a conventional keeper of U-shaped, rigid construction and flattening its bight section by suitable means. Secondly, the bight section of a conventional keeper may be cut off and replaced with an elongate, flexible strip or band of material that is welded or otherwise attached at its opposite ends in interconnecting relation to said cylindrical opposite ends 36, 38.

A plurality of notches, collectively denoted 42, are formed on a first end of keeper 34 and a second plurality of notches, collectively denoted 44, are formed on a second end of said keeper. These notches are provided on conventional keepers.

When in repose, as depicted in FIGS. 1 and 1A, the opposite ends of keeper 34 are transversely spaced apart from one another by a distance greater than the diameter of hollow axle 18. Accordingly, to install novel device 30, bight member 40 thereof is placed into capturing relation to hollow axle 18, i.e., said bight 40 is placed on the forward side of protrusion 14, defining the front of the truck as being the forward side of said protrusion, tailgate 16 is rotated into the position depicted in hollow lines in FIG. 1 so that opening 20 aligns with protrusion 14, and the tailgate is then lowered until said protrusion is fully housed within said hollow axle. The opposite ends 36, 38 of keeper 34 are then brought toward one another until they align with keeper-receiving bores formed in lock body 32. Said opposite ends are then introduced into said bores until the keeper and lock body snugly surround the hollow axle and the protrusion received therewithin. The particular notches that are engaged are determined by the diameter of hollow axle 18, which diameter may be different as between various truck manufacturers. Thus, where a hollow axle of maximum diameter is encountered, the notches near the respective distal free ends of cylindrical members 36, 38 will be engaged, and where a hollow axle of minimum diameter is encountered, the notches nearest bight member 40 will be engaged.

By surrounding hollow axle 18 and trapping protrusion 14 therewithin, said lock body 32 and keeper 34 cooperate with one another to prevent removal of protrusion 14 from opening 20, even when the tailgate is rotated into said position where protrusion 14 and opening 20 are in alignment with one another.

In other words, flat bight member 40 is positioned in capturing relation to "C"-shaped hollow axle 18 so that protrusion 14 may not exit through opening 20 defined by opposite ends of said "C"-shaped hollow axle when tailgate 16 is positioned at a predetermined angle relative to a vertical plane where protrusion 14 is in alignment with opening 20.

Just as in the Young device, the novel lock and keeper of this invention fits within a space between a truck side wall 12 and tailgate 16 and therefore do not interfere with the normal opening and closing of the tailgate. A transversely extending tailgate flange 16a hides the novel apparatus from view when the tailgate is in its fully closed, upright position. Moreover, there is no need to remove the novel lock and keeper for any occasion, unless it is being removed when the truck is sold; such removal is accomplished simply by unlocking the lock so that both ends of keeper 34 may be slideably removed from their respective bores.

It is worth noting that it does not take much strength to squeeze the opposite ends 36, 38 of keeper 34 to bring them into parallel alignment with one another when they are inserted into their respective bores. Flat bight member 40 has a natural or inherent resiliency which holds opposite ends 36, 38 in diverging relation to one another when the keeper is in repose, as mentioned earlier, but such bias is easy to overcome when it is desired to insert said opposite ends into their respective bores.

A conventional lock keeper cannot be positioned in locking engagement around hollow axle 18, trapping protrusion 14 therewithin.

If a truck model has a mechanically equivalent means for rotatably mounting a tailgate to a pickup truck, the novel device will still work. For example, one mechanical equivalent would include a protrusion like protrusion 14 mounted on the tailgate at the same location as hollow axle 18, and a hollow axle member like hollow axle member 20 mounted on sidewall 12 in the same location as protrusion 14. This would simply be the mechanical reverse of the illustrated environment, and the novel lock would still be used in the same way to do the same work by the same means.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An anti-theft device for locking a tailgate onto a pickup truck, wherein the pickup truck includes a side wall having a transversely disposed, inwardly protruding protrusion extending therefrom at a predetermined angle relative to a vertical plane, and wherein the tailgate has a transversely disposed, outwardly protruding "C"-shaped hollow axle at a lowermost corner thereof for receiving the protrusion, comprising:

a locking device having a lock body, a keeper, and a locking means within said lock body, said locking means having a locked configuration and an unlocked configuration;

said keeper having cylindrical opposite ends, of solid construction, interconnected by a thin, flexible, resilient, flat bight member;

a plurality of longitudinally spaced notches formed in each of said cylindrical opposite ends of said keeper;

said lock body having a pair of spaced apart bores for releasably receiving said cylindrical opposite ends of said keeper, said locking means maintaining said opposite ends of said keeper within said lock body by engaging preselected notches of said plurality of notches when said locking means is in its locked configuration and said locking means releasing both ends of said keeper by releasing said preselected notches when said locking means is in its unlocked configuration;

said cylindrical opposite ends of said keeper being disposed in diverging relation to one another when in repose and in parallel relation to one another when said cylindrical opposite ends are received within said bores;

said lock body and said keeper being positioned in a space between said pickup truck side wall and said tailgate when said keeper and lock body are disposed in enclosing relation to said protrusion and said hollow axle so that said lock body and said keeper do not interfere with opening and closing of said tailgate;

said flat bight member being positioned in capturing relation to said "C"-shaped hollow axle so that said protrusion may not exit through an opening defined by opposite ends of said "C"-shaped hollow axle when said tailgate is positioned at a predetermined angle relative to a vertical plane where said protrusion is in alignment with said opening;

whereby a space enclosed by said keeper and said lock body is made progressively smaller when said opposite ends of said keeper are inserted progressively further into said lock body so that said enclosed space may be sized to receive protrusions and hollow axles of differing diameters.

2. The anti-theft device of claim 1, wherein said locking means within said lock body is operated by a key.

3. The anti-theft device of claim 1, wherein said locking means within said lock body is operated by a combination locking means.

4. The anti-theft device of claim 1, wherein said keeper is formed of a metallic material and wherein said flat bight member is formed of a material that is flexible and inherently resilient.

5. The anti-theft device of claim 1, wherein said opposite ends of said keeper and said bight member are integrally formed with one another.

6. The anti-theft device of claim 1, wherein said bight member is secured by suitable means at its opposite ends to said cylindrical opposite ends of said keeper.

* * * * *